United States Patent
Smith et al.

(10) Patent No.: US 9,190,644 B2
(45) Date of Patent: Nov. 17, 2015

(54) STAGING SYSTEM FOR BATTERY ON A PORTABLE TOOL

(75) Inventors: Aida Smith, Bull Valley, IL (US);
Stephen J. Towner, Gurnee, IL (US);
Ryan Garrett, Buffalo Grove, IL (US);
John Powers, Hoffman Estates, IL (US);
Brent Peterson, Buffalo Grove, IL (US)

(73) Assignee: Echo, Inc., Lake Zurich, IL (US)

( * ) Notice: Subject to any disclaimer, the term of this patent is extended or adjusted under 35 U.S.C. 154(b) by 1000 days.

(21) Appl. No.: 13/332,651

(22) Filed: Dec. 21, 2011

(65) Prior Publication Data
US 2013/0164587 A1    Jun. 27, 2013

(51) Int. Cl.
*H01M 2/10*    (2006.01)

(52) U.S. Cl.
CPC .......... *H01M 2/1066* (2013.01); *H01M 2/1022* (2013.01); *H01M 2/1061* (2013.01)

(58) Field of Classification Search
CPC ............ H01M 2/1044; H01M 2/1055; H01M 2/1066; H01M 2/1022; H01M 2/1027; H01M 2/1033; H01M 2/1038; H01M 2/105; H01M 2/1061
USPC ........................................ 429/96, 97, 98, 100
See application file for complete search history.

(56) References Cited

U.S. PATENT DOCUMENTS

| | | | |
|---|---|---|---|
| 2,933,548 A * | 4/1960 | Walker | 429/100 |
| 5,663,011 A | 9/1997 | Bunyea et al. | |
| 7,005,831 B2 | 2/2006 | Watson et al. | |
| 7,455,544 B2 | 11/2008 | Glauning | |
| 7,759,898 B2 | 7/2010 | Brotto | |
| 7,816,888 B2 | 10/2010 | Rejman et al. | |
| 2009/0180829 A1* | 7/2009 | Rejman et al. | 403/331 |
| 2009/0263711 A1* | 10/2009 | Kim et al. | 429/164 |
| 2010/0136405 A1* | 6/2010 | Johnson et al. | 429/120 |

* cited by examiner

*Primary Examiner* — Eugenia Wang
(74) *Attorney, Agent, or Firm* — Wood, Phillips, Katz, Clark & Mortimer

(57) ABSTRACT

A portable battery-operated tool has a frame on which there are a working component, a drive, and a battery assembly. The battery assembly consists of a battery with at least a first electrical connector and housing with at least a second electrical connector. The battery is movable guidingly between first and second positions. With the battery in the first position the at least first electrical connector is electrically engaged with the at least second electrical connector. With the battery in the second position the at least first electrical connector is electrically disengaged from the at least second electrical connector so that the battery is not powering the drive to allow the drive to be operated. The battery assembly further has a locking assembly through which the battery is selectively releasably fixed in the second position.

24 Claims, 5 Drawing Sheets

STAGING SYSTEM FOR BATTERY ON A PORTABLE TOOL

BACKGROUND OF THE INVENTION

1. Field of the Invention

This invention relates to portable tools, such as those used in the landscaping industry and, more particularly, to a portable tool with a removable/rechargeable battery.

2. Background Art

Portable tools, such as those in the landscaping industry used to trim trees and bushes, cut and edge lawns, etc., have commonly used gas powered engines. Gas powered engine technology has evolved over the decades to the point that these engines can be made compact and lightweight yet with high power output capacity. They have thus been preferred by commercial industries that put significant demands on this type of equipment.

Regardless of how efficient these engines are, noise generation and emissions are unavoidable. Many states and local municipalities have placed regulations upon both noise and emissions that have severely impacted how this type of equipment must be designed and restricted how it may be utilized publicly by landscaping crews and homeowners alike.

These restrictions have in part prompted a movement towards battery powered equipment. Since no fuels are combusted with this type of equipment, emissions issues are avoided. Further, electric motors can be operated with limited noise generation.

The industry contends with different challenges with battery-operated equipment; notably, developing battery technology that is practical from the standpoints of cost, manufacture and use.

Battery-operated technology is currently being incorporated into lines of landscaping equipment that has operating components built around an elongate pole. For example, line trimmers, edgers, pruning saws, hedge clippers, etc. are commonly built upon an elongate pole foundation.

In one exemplary line trimmer, a motor is incorporated at a distal pole end where the trimmer head is placed. At the proximal end, a battery is removably mounted. Electrical wiring is tunneled through the pole between the motor and battery. Between the motor and battery, handles and operating controls are placed. This type of design strategically locates the components to produce a balanced device that can be comfortably lifted, held and repositioned by a user. The primary balancing masses are: a) the motor and trimmer head, at the distal end of the pole; and b) the battery at the proximal end. The fulcrum location is approximately mid-way between these components.

The development of pole-type battery-powered landscaping tools has also created a challenge for those that display the same at point of sale. Both light and commercial grade line trimmers are offered in many different types of hardware and home improvement stores wherein a wide range of landscaping products is available. Heretofore, these pole-type tools have generally been either displayed in boxes or compactly displayed by hanging them without any box or other significant packaging with the pole lengths vertically oriented. The optimal manner of display involves having the tools in a state, without using any boxes or other packaging, wherein a potential purchaser can simply separate the tool from the supporting display structure and manipulate it as he/she would in use. There are problems associated with displaying battery-operated tools in this manner.

Because the batteries for such tools are relatively heavy, and critical to achieving proper balance, for the actual feel of the product to be sensed, it is important that the product be displayed with the battery in place. However, if the battery is in place and operatively installed, there is a danger that a user might inadvertently operate the equipment, which could result in personal injury and/or damage to the display area or objects therearound.

To avoid this potential problem, the battery can be separated from the rest of the tool, and either: a) incorporated into the product packaging without being operatively positioned; or b) offered as a separate item. If the battery is included with the packaging for the tool and not installed, the potential consumer is precluded from holding the tool and sensing actual feel. This ultimately may discourage sales.

If the battery is sold as a separate unit, the tool by itself is significantly out of balance, and again a potential consumer will not be able to get a realistic feel for weight and balance characteristics for the tool, thus potentially affecting a purchasing decision.

The industry also contends with a theft problem. As battery technology advances, batteries for tools of the type described above are becoming increasingly smaller in size, yet more expensive to manufacture. The batteries, as they are currently associated with displayed tools, are vulnerable to theft. No practical way exists to secure these batteries against theft, particularly when they are operatively connected to a conventionally displayed tool.

The industry continues to seek out ways to securely display battery-operated tools in a manner that will encourage their purchase without compromising the safety of persons at or in the vicinity of a display.

SUMMARY OF THE INVENTION

In one form, the invention is directed to a portable battery-operated tool having a frame on which there are a working component, a drive, and a battery assembly. The battery assembly consists of a battery with at least a first electrical connector and housing with at least a second electrical connector. The battery is movable guidingly between first and second positions. With the battery in the first position the at least first electrical connector is electrically engaged with the at least second electrical connector. With the battery in the second position the at least first electrical connector is electrically disengaged from the at least second electrical connector so that the battery is not powering the drive to allow the drive to be operated. The battery assembly further has a locking assembly through which the battery is selectively releasably fixed in the second position.

In one form, the housing has a receptacle for the battery with the battery in each of the first and second positions.

In one form, the receptacle has a cup-shaped configuration opening along a line. The battery moves along the line between the first and second positions, and resides at least partially within the receptacle in each of the first and second positions.

In one form, the frame is in the form of an elongate pole with proximal and distal ends. The working component is at the distal end of the elongate pole and the housing is at the proximal end of the elongate pole.

In one form, the locking assembly has at least one movable component that acts between the housing and the battery.

In one form, the battery is movable along a line between the first and second positions and the one movable component is advanced transversely to the line between a released position and an engaged position.

In one form, the one movable component has a threaded element that is threadably engaged with the housing so that turning of the movable component relative to the casing advances the movable component into the engaged position.

In one form, the battery has a casing with a receptacle and the one movable component is advanced into the receptacle with the battery in the second position.

In one form, the battery is movable along a line between the first and second positions. The one movable component is advanced transversely to the line from a released position into an engaged position wherein a part of the one movable component resides in the receptacle with the battery in the second position.

In one form, the receptacle has a blind opening.

In one form, the part of the one movable component is unthreaded.

In one form, the part of the one movable component and receptacle are configured so that the part of the one movable component substantially blocks movement of the battery in each of two opposite directions along the line with the battery in the second position.

In one form, the one movable component cooperates with the housing so that the one movable component is guided by the housing relative to the casing into the engaged position.

In one form, there are cooperating threads on the one movable component and housing whereby turning of the one movable component around an axis in one direction advances the one movable component into the engaged position.

In one form, the one movable component can be turned around the axis oppositely to the one direction to fully separate the one movable component from the housing.

In one form, the battery casing has a second receptacle into which the part of the one movable component is advanced with the battery in the first position so that the part of the one movable component substantially blocks movement of the battery in each of two opposite directions along the line with the battery in the first position.

In one form, the one movable component has a head with a fitting thereon for engagement by a tool that can be used to turn the one movable component.

In one form, the housing has an outer surface and a recess through the outer surface to receive the head of the one movable component so that the head on the one movable component does not project from the outer surface of the housing.

In one form, the housing has a non-metal wall and the threads on the housing are defined by a metal part on the housing.

In one form, the second receptacle has an unthreaded opening.

DETAILED DESCRIPTION OF THE PREFERRED EMBODIMENT

Figure 1:
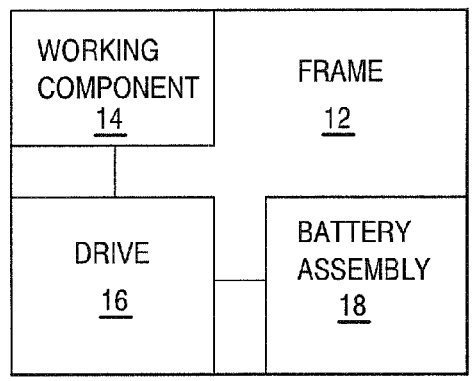
FIG. 1 is a schematic representation of a tool, according to the present invention, consisting of a frame upon which are provided a working component, a drive for the working component, and a battery assembly.
Figure 2:
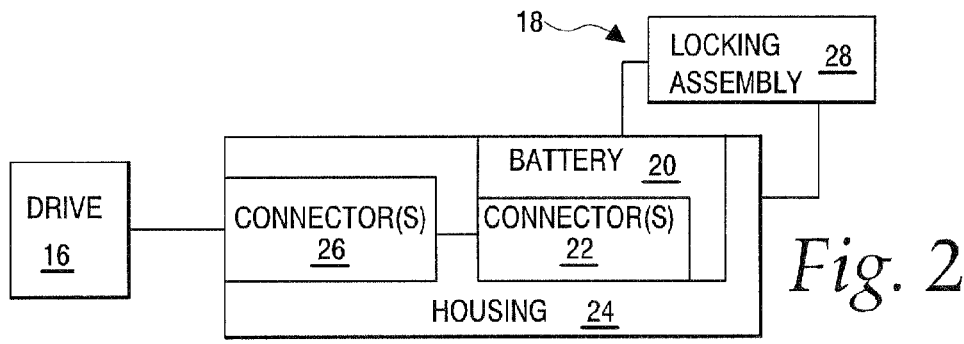
FIG. 2 is a more detailed schematic representation of the battery assembly and drive in FIG. 1.
Figure 3:
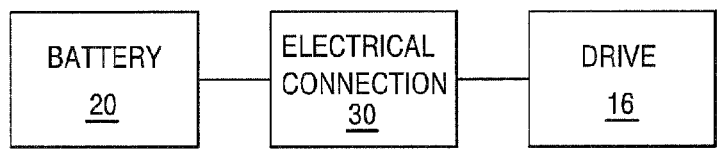
FIG. 3 is a schematic representation of an electrical connection between the battery and drive in FIGS. 1 and 2.
Figure 4:
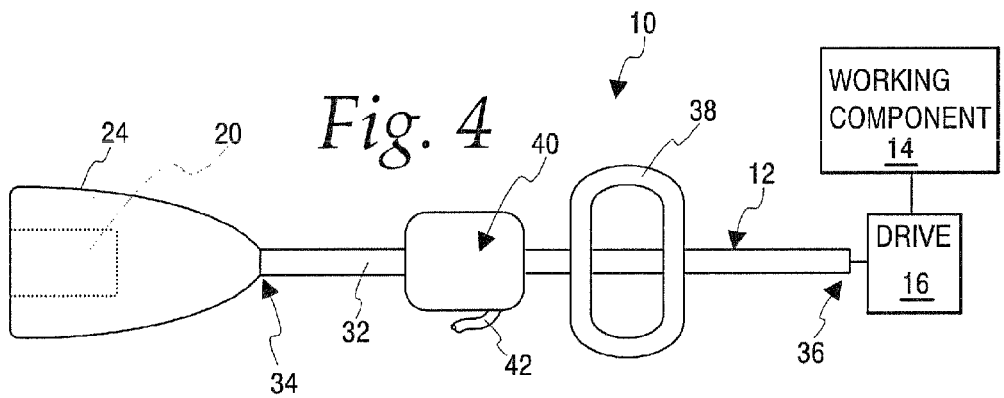
FIG. 4 is a partially schematic, elevation view of one specific form of tool as shown in FIGS. 1-3.

A schematic representation of a portable, battery-operated tool, according to the present invention, is shown at 10 in FIGS. 1-3. The tool 10 is shown in schematic form to encompass the specific embodiments described herein, and variations thereof involving use of virtually an unlimited number of modified and/or different components consistent with the basic inventive concept.

The tool 10 consists of a frame 12 upon which a working component 14, a drive 16 for the working component 14, and a battery assembly 18 are provided. The battery assembly 18 consists of a battery 20 with at least a first electrical connector 22. The battery 20 is supported upon a housing 24 that has at least a second electrical connector 26.

The battery 20 is movable guidingly relative to the housing 24 between first and second positions. With the battery 20 in the first position therefor, the at least first electrical connector 22 is electrically engaged with the at least second electrical connector 26, thereby to cause the battery 20 to be operatively connected to the drive 16 so as to power the drive 16 and permit its operation by a user.

With the battery in the second position therefor, the at least first electrical connector 22 is electrically disengaged from the at least second electrical connector 26 so that the battery 20 is not powering the drive 16 to allow the drive 16 to be operated.

The battery assembly 18 further includes a locking assembly 28 through which the battery 20 can be selectively releasably fixed in at least the second position therefor.

As seen in FIG. 3, the invention contemplates any type of electrical connection, as shown generically at 30 in FIG. 3, between the drive 16 and battery 20. Virtually an unlimited number of different designs may be generated by those skilled in the art.

One specific form of the tool 10 is shown in FIGS. 4-9. As noted above, this specific form of tool is only exemplary in nature and should not be viewed as limiting.

The specific tool 10 shown in FIGS. 4-9 is a "pole-type" tool wherein the frame 12 is in the form of an elongate pole 32 with proximal and distal ends 34, 36, respectively. The working component 14 is at the distal end 36 of the pole 32, with the housing 24 at the proximal end 34 of the pole 32. The working component 14 may have any type of configuration as commonly used on pole-type tools. Among the many different working components 14 contemplated are line trimmers, chain cutters, hedge clippers, etc. as depicted in exemplary U.S. Pat. Nos. 5,718,050 and 7,823,652, incorporated herein by reference.

In this embodiment, the drive 16, typically in the form of an electrically operated motor, is provided at the distal end 36 of the pole 32 to operate the working component 14.

The primary masses for the tool 20 are: a) the battery 20 at the proximal end 34 of the pole 32; and b) the combined drive 16 and working component 14 at the distal end 36 of the pole 32. A fulcrum, about which there is lengthwise weight balance, is located approximately mid-way between the proximal and distal ends 34, 36 of the pole 32. It is generally at this location where a graspable, loop-shaped handle 38 is mounted in the vicinity of a hand-operable control 40 which may include, among other components, a trigger 42 that can be repositioned by a user to selectively change the operating speed for the drive 16. The control 40 will typically incorporate other components, common to this type of tool, and detailed description of the same is not critical herein. For example, there may be safety switches, an on/off switch, etc.

Figure 7:
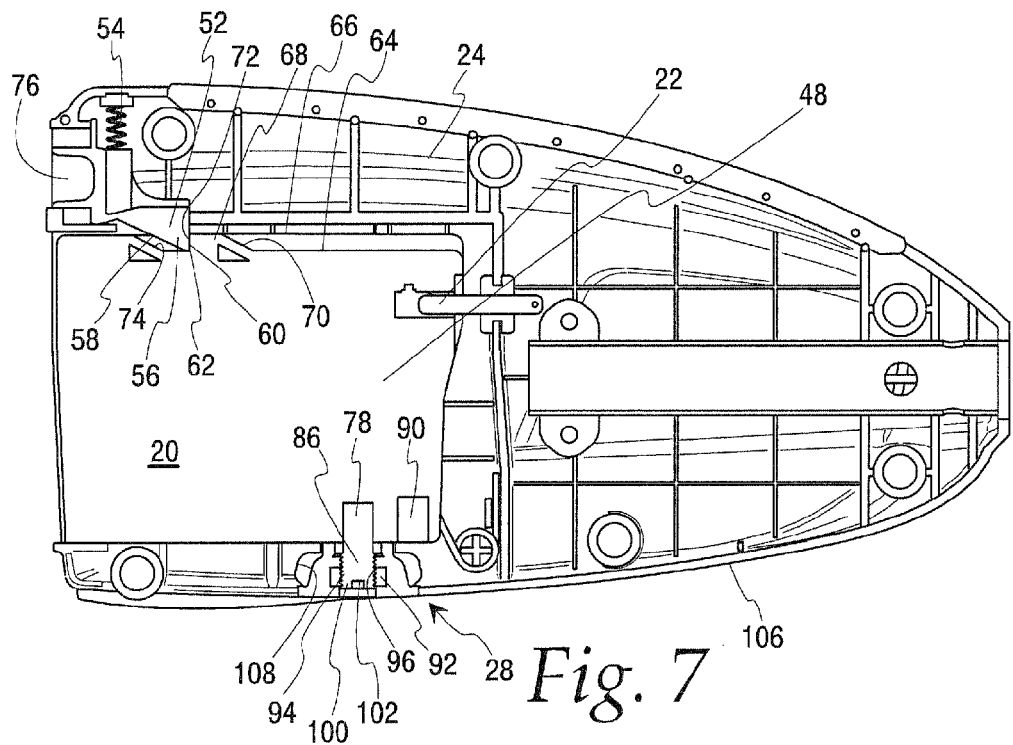
FIG. 7 is a partial cross-sectional view of the battery assembly in FIGS. 4-6 and with the battery in a first position therefor.
Figure 8:
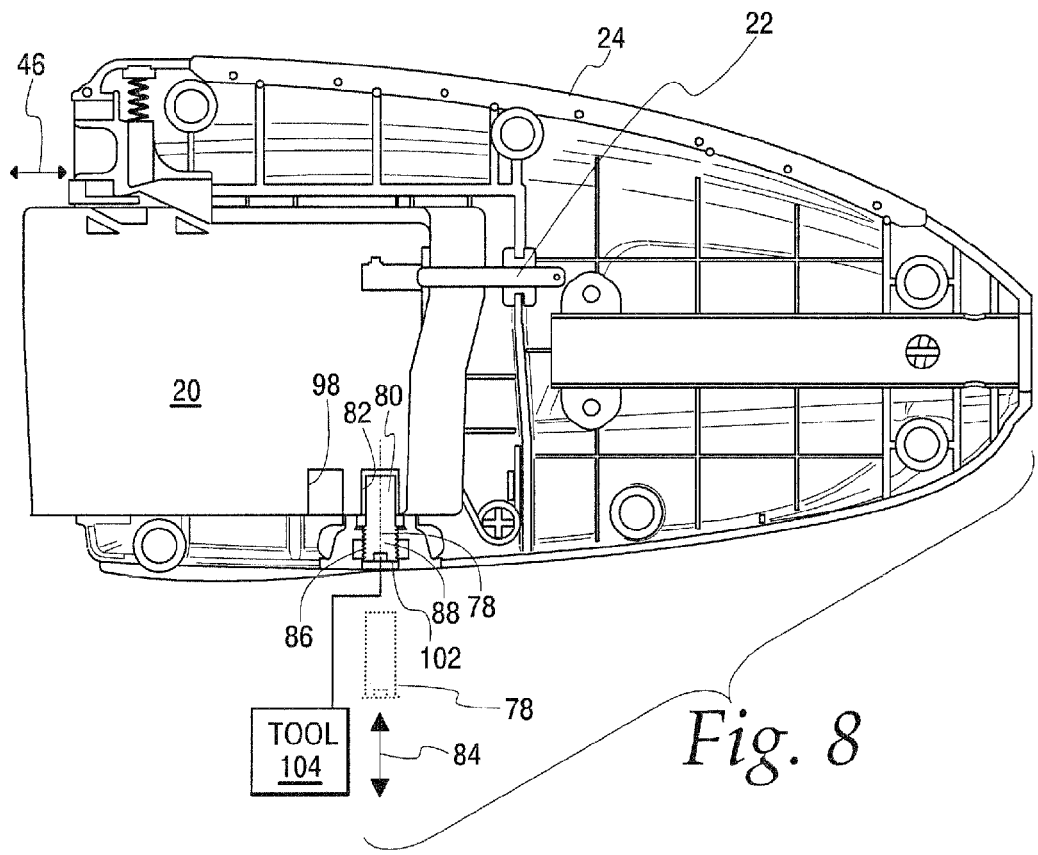
FIG. 8 is a view as in FIG. 7 with the battery in a second position therefor.
Figure 9:
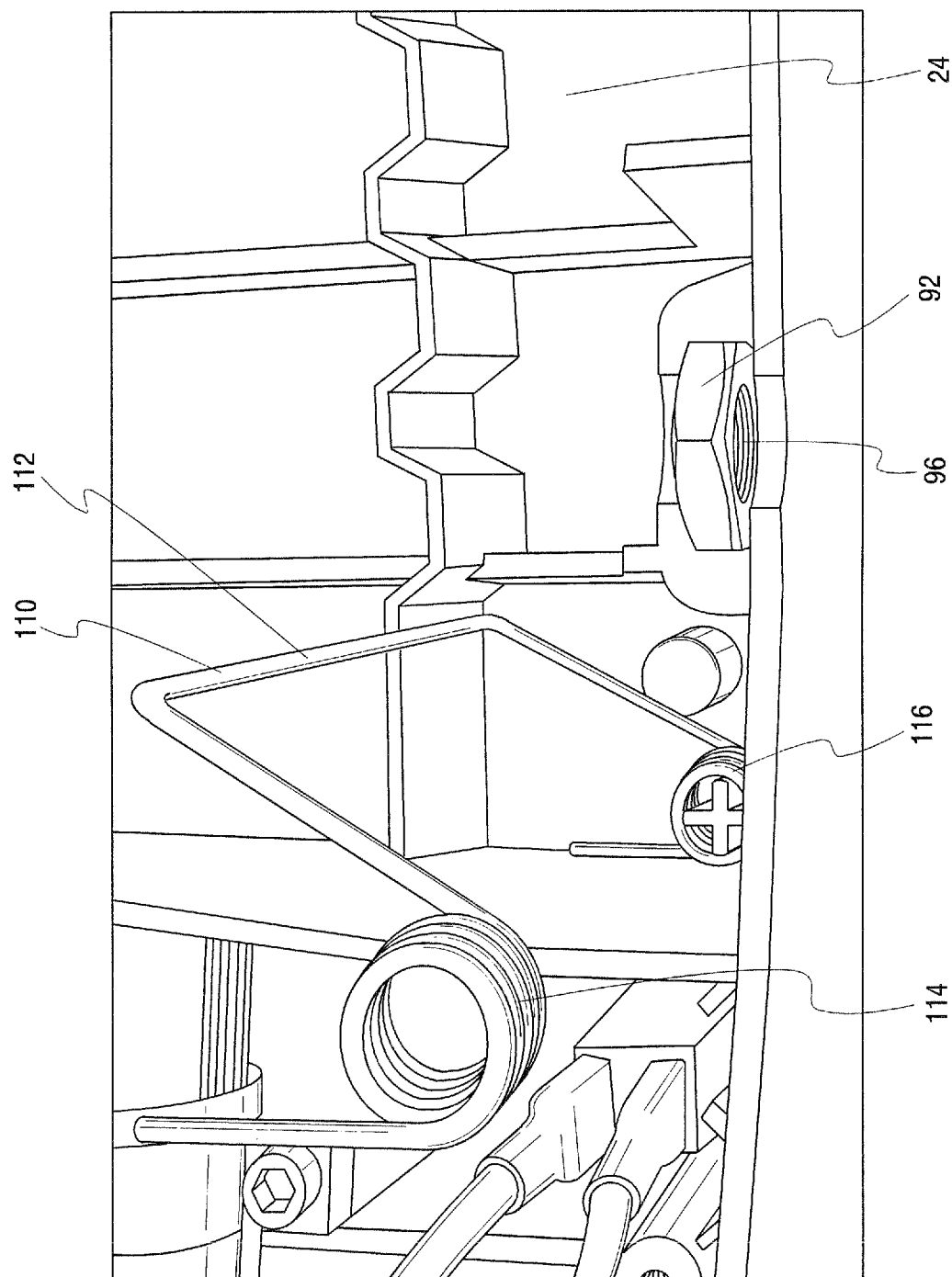
FIG. 9 is an enlarged, fragmentary, perspective view of the battery assembly in FIGS. 4-8 and showing a spring structure for normally urging the battery in the first position therefor towards the second position therefor.

The housing 24 defines a receptacle 44 for the battery 20. In this particular embodiment, the receptacle 44 is cup-shaped, opening along a line as indicated by the double-headed arrow 46 in FIG. 6. In this embodiment, the battery 20 resides at least partially within the receptacle 44 with the battery in each of its first position, as shown in FIG. 7, and its second position, as shown in FIG. 8. The battery 20 is translatable guidingly along the line indicated by the double-headed arrow 46 as it moves between its first and second positions.

Figure 6:
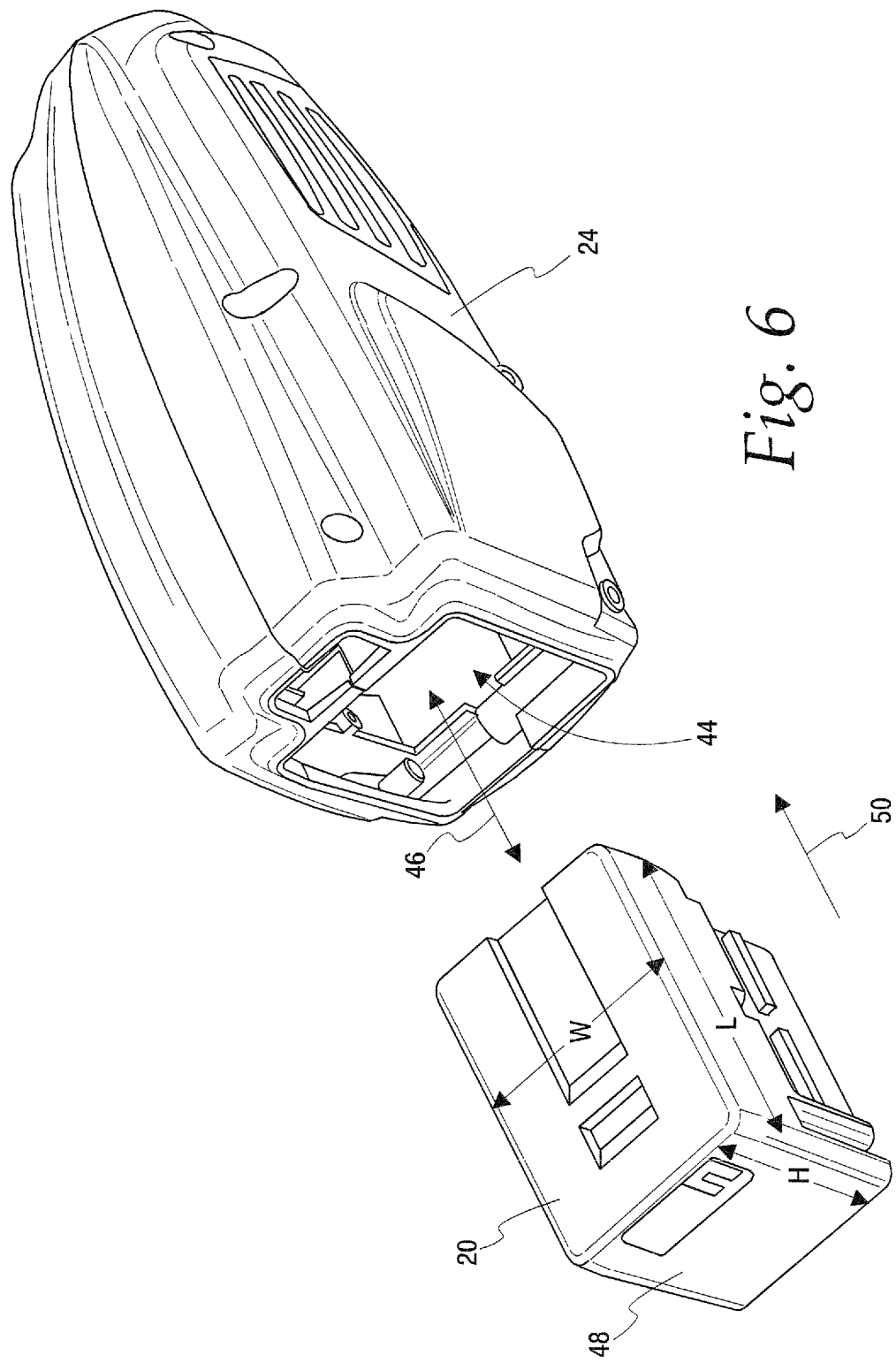
FIG. 6 is a fragmentary, perspective view of the battery assembly in FIGS. 4 and 5, and with a battery thereon in a separated position.

In this embodiment, the battery 20 has a generally squared casing 48 with a length L, a width W, and a height H, as indicated in FIG. 6. The receptacle 44 is nominally matched to the length L, width W, and height H of the battery casing 48, being slightly larger than the casing 48 to allow the battery 20 to be guidingly translated in the direction of the arrow 50 in FIG. 6, parallel to the line indicated by the arrow 46, from a separated position to within the receptacle 44 without any significant resistance.

As the battery 20 realizes its first position, a plurality of the connectors 26 mechanically and electrically engage a like number of the connectors 22 on the battery 20 so that the tool 10 is in a state to be operated by a user through the available controls thereon.

The battery 20 is releasably maintained in its first position through a latch element 52 that is movable guidingly in a vertical direction in FIG. 7 relative to the housing 24 and biased downwardly by a pair of coil springs 54. The latch element 52 has a blocking component 56 with a ramp surface 58 and a stop surface 60.

As the battery 20 is directed into the receptacle 44, an edge 62 at the juncture of the ramp and stop surfaces 58, 60 slides guidingly along a surface 64 on the battery casing 48 that is spaced slightly below a top surface 66 of the battery casing 48.

A projection 68 on the battery casing 48 defines a ramp surface 70 and a blocking surface 72. As the battery 20 is advanced towards its first position, the ramp surface 70 on the battery casing 48 encounters the ramp surface 58 on the latch element 52 and progressively deflects the latch element 52 upwardly against the force produced by the spring 54, allowing the edge 62 to slide along the top of the projection 68 until the stop surface 60 aligns with the blocking surface 72, at which point the spring 54 drives the latch element 52 downwardly so that the blocking component 56 moves into a receptacle 74 on the top of the battery casing 48. This allows the stop surface 60 and blocking surface 72 to facially confront each other, thereby blocking movement of the battery 20 from its first position towards its second position.

The latch element 52 is manually repositionable upwardly to move the blocking component 56 out of the receptacle 74, whereby the stop and blocking surfaces 60, 72 no longer interfere with each other, whereupon the battery 20 can be slid outwardly, i.e., from the first position therefore towards the second position therefor. A finger receptacle 76 is provided on the latch element 52 to facilitate upward translation thereof by a user against the force of the spring 54.

The locking assembly 28 is provided to maintain the battery 20 in its second position and optionally provides a structure, redundant to the latch element 52, for maintaining the battery 20 in its first position.

It is preferred that the second position for the battery 20, as shown in FIG. 8, be at or near that battery position wherein the connectors 22, 26 first disengage upon being translated from its first position. Additional spacing between the connectors 22, 26 may be provided for safety reasons so that a modicum of shifting of the battery 20, as by force application to the battery 20 or by an impact, will not re-engage the connectors 22, 26.

As noted above, the locking assembly 28 can take virtually an unlimited number of different forms, any of which are contemplated by the invention so long as the battery 20 is capable of being maintained therethrough in its second position. Generally, it is contemplated that the locking assembly 28 will have at least one movable component that acts between the housing 24 and battery 20.

In the depicted embodiment, the movable component is shown at 78 that is advanced transversely to the line indicated by the double-headed arrow 46 between a released position, shown in dotted lines in FIG. 8, and an engaged position, as shown in solid lines in that same Figure. In the depicted embodiment, the released position is shown as a position wherein the movable component 78 is fully separated from the housing 24. Full separation is not required for the released position.

In the engaged position for the movable component 78, a part 80 thereof is advanced into a receptacle 82 in the battery casing 48. Advancing between the released and engaged positions, the movable component 78 moves in a path transversely to the line indicated by the double-headed arrow 46. In the depicted embodiment, the path of the movable component is along a line indicated by the double-headed arrow 84 that is substantially orthogonal to the line indicated by the double-headed arrow 46.

The movable component 78 is shown with a threaded part 86 that is threadably engaged with the housing 24 so that turning of the movable component 78 around an axis 88 relative to the casing 48 advances the movable component 78 into its engaged position.

In the embodiment shown, the receptacle 82 is in the form of a blind, cylindrical opening. The part 80 of the movable component 78 that moves into the receptacle 82 may be unthreaded, though this is not a requirement. It is also possible for there to be a threaded connection between the movable component 78 and the battery casing 48.

In the embodiment depicted, the part 80 of the movable component 78 is preferably relatively closely received within the receptacle 82 so that the part 80 of the movable component 78 interacts with the surface 90 bounding the receptacle 82 to substantially block movement of the battery 20 in each of two opposite directions along the line indicated by the double-headed arrow 46 without excessive play allowed. Positive blocking of the battery 20 results with a modicum of movement potentially permitted. The part 80 and surface 90 are relatively dimensioned with enough clearance so that precise alignment of the component 78 and receptacle 82 is not required and there is no significant interference between the surface 90 and part 80 of the movable component 78 as the movable component 78 is advanced into the receptacle 82. However, a tight enough fit is also contemplated whereby the battery 20 becomes securely and positively fixed. This might be facilitated by providing cooperating guide surfaces on the movable component 78 and battery 20, such as ones with a guiding taper.

In this embodiment, the housing 24 is shown molded from a non-metal material. An internally threaded metal part 92 is fixed to the housing 24 to cooperate with the threaded part 86 that has external threads 94. Internal threads 96 on the metal part 92 and the external threads 94 cooperate so that the movable component 78 is guided along the axis 88 relative to the housing 24 as the movable component 78 is turned around the axis 88 as the movable component 78 is moved into the engaged position therefor. Turning of the movable component 78 in one direction around the axis 88 advances the movable component fully into its engaged position, whereas turning oppositely allows the movable component 78 to be fully separated from the housing 24 or otherwise moved into a released position wherein the movable component 78 is not fully separated.

The battery casing 48 has an optional second receptacle 98 that cooperates with the movable component 78 in the same manner that the movable component 78 cooperates with the receptacle 82, but with the battery 20 in its first position, as shown in FIG. 7. This affords redundant holding of the battery 20 to the holding afforded by the latch element 52.

The movable component 78 has a head 100 with a fitting 102 thereon for engagement by a complementary tool 104 that can be used to turn the movable component 78 around its axis 88.

The housing 24 has an outer surface 106 and a recess 108 through the outer surface 106 to receive the head 100 of the movable component 78 so that the head 100 does not project from the outer surface 106 with the movable component 78 in the engaged position therefor.

In this embodiment, a wire spring 110 has a U-shaped portion 112 that bears against the casing 48, with the battery 20 in its first position, to normally urge the battery 20 towards the second position. Spaced coils 114, 116 on the housing 24 are pre-loaded and thereby produce a torsional force that biases the U-shaped portion against the battery casing 48 as described.

With the inventive structure, the battery 20 can be safely staged in the second position therefor. The battery 20 can be locked positively against movement in either direction along the line indicated by the double-headed arrow 46. In the event that shifting of the battery is permitted, the structure preferably is configured so that the battery 20 is positively blocked against movement in opposite directions to prohibit both its separation and electrical re-connection. At the same time, the shift between the first position and second position for the battery 20 is not significant enough to noticeably alter the balancing effect of the battery 20. Accordingly, the tool 10 can be safely stored at point-of-purchase displays in a non-operative state, yet in a state wherein the "feel" of the tool 10 is substantially the same as it will be during operation.

Further, the movable component 78 blocks the battery against separation from its associated tool. This deters theft while representing a minimal inconvenience to a purchaser. That is, the purchaser can remove and dispose of the movable component after purchase. He/she may alternatively opt to keep the movable component 78 and use it to store a tool with the battery kept with the tool in an inoperative state. For greater theft deterrence, a special tool configuration may be required to engage the movable component to effect repositioning thereof.

Figure 5:
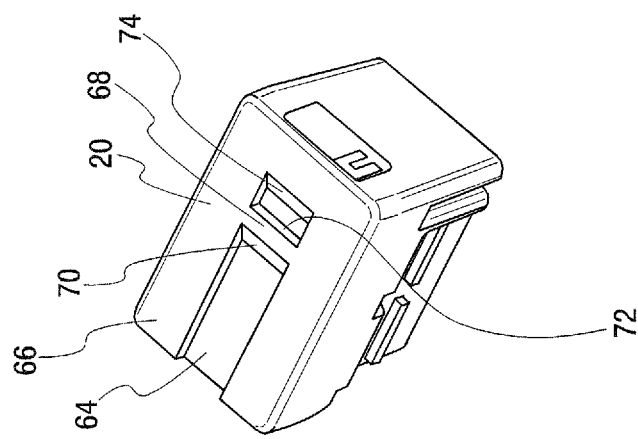
FIG. 5 is an exploded, perspective view of the battery assembly on the tool in FIG. 4.
Figure 5:
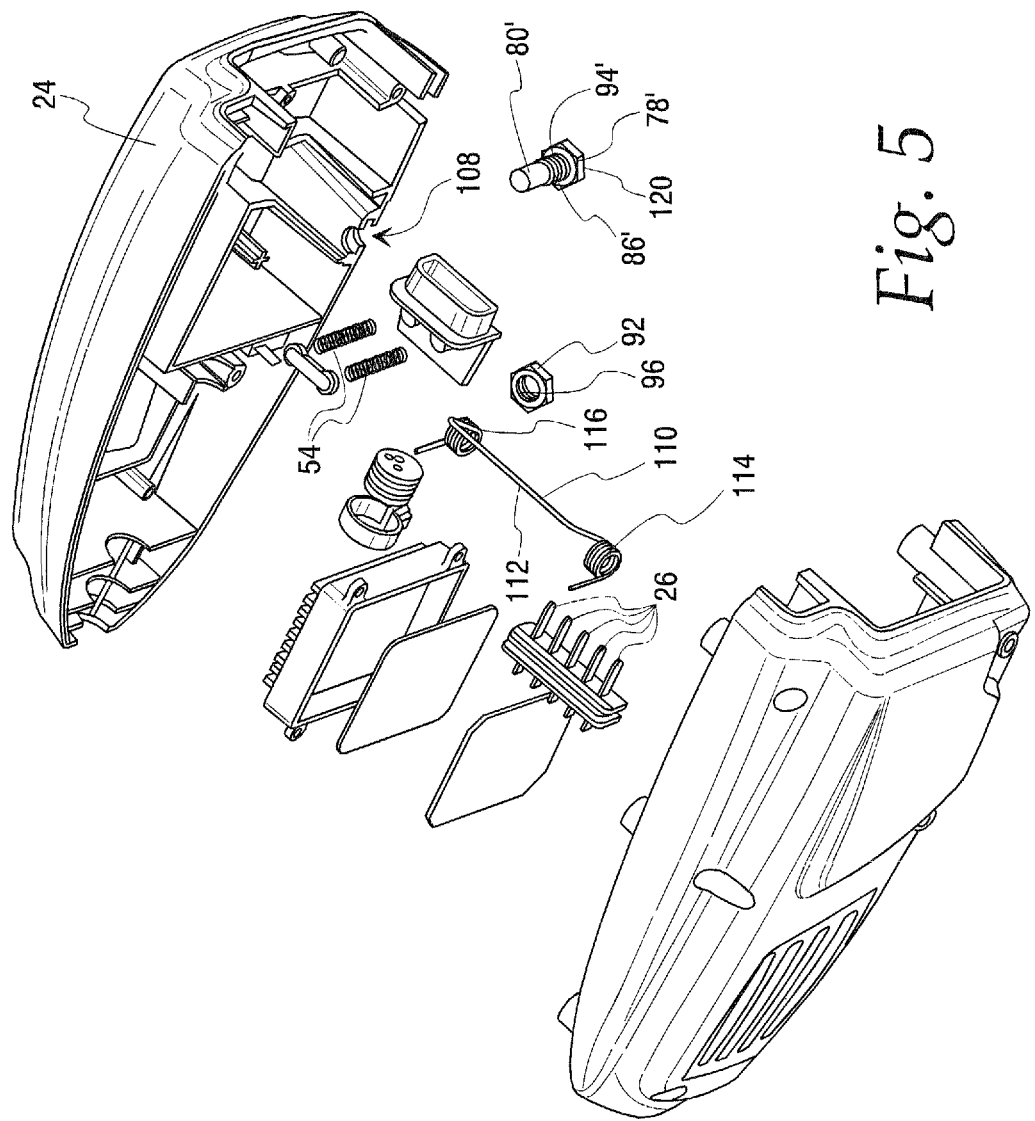

In FIG. 5, a modified form of movable component 78' is shown with parts 80', 86', 94' corresponding to those with the same reference numerals in the movable component 78 but with a "'" designation. A polygonal head 120 is provided on the movable component 78 to be engaged by a standard tool (not shown).

The foregoing disclosure of specific embodiments is intended to be illustrative of the broad concepts comprehended by the invention.

The invention claimed is:

1. A portable battery-operated tool comprising:
   a frame;
   a working component on the frame;
   a drive for the working component on the frame; and
   a battery assembly on the frame,
   the battery assembly comprising a battery with at least one first electrical connector and a housing with at least one second electrical connector,
   the battery movable guidingly relative to the housing in a first direction between first and second positions,
   whereby with the battery in the first position the at least one first electrical connector is electrically engaged with the at least one second electrical connector thereby to cause the battery to be operatively connected to the drive so as to power the drive,
   whereby with the battery in the second position the at least one first electrical connector is electrically disengaged from the at least one second electrical connector so that the battery is not powering the drive to allow the drive to be operated,
   the battery assembly further comprising a locking assembly through which the battery is selectively releasably fixed in the second position,
   the locking assembly configured so that with the battery fixed in the second position through the locking assembly the battery and housing cannot be moved relative to each other to allow the battery to change from the second position into the first position,
   wherein the locking assembly comprises at least one component that is movable selectively between engaged and released positions,
   the at least one component in the engaged position configured so that the at least one component blocks movement of the battery relative to the housing both in the first direction and oppositely to the first direction.

2. The portable battery-operated tool according to claim 1, wherein the housing defines a receptacle for the battery with the battery in each of the first and second positions.

3. The portable battery-operated tool according to claim 2, wherein the receptacle has a cup-shaped configuration opening along a line, the battery moves along the line between the first and second positions, and a majority of the battery resides within the receptacle in each of the first and second positions.

4. The portable battery-operated tool according to claim 1, wherein the frame is in the form of an elongate pole with proximal and distal ends, the working component is at the distal end of the elongate pole and the housing is at the proximal end of the elongate pole.

5. The portable battery-operated tool according to claim 4, wherein the at least one movable component is fully separable from the housing and acts between the housing and the battery.

6. The portable battery-operated tool according to claim 1, wherein the at least one movable component is fully separable from the battery and acts between the housing and the battery.

7. The portable battery-operated tool according to claim 6, wherein the battery is movable along a line between the first and second positions and the at least one movable component is advanced transversely to the line between a released position and an engaged position.

8. The portable battery-operated tool according to claim 6, wherein the at least one movable component comprises a threaded element that is threadably engaged with the housing so that turning of the threaded element relative to the housing advances the threaded element into the engaged position wherein the threaded element blocks movement of the battery relative to the housing both in the first direction and oppositely to the first direction.

9. The portable battery-operated tool according to claim 8, wherein the at least one movable component has a head with a non-standard fitting thereon for engagement by a tool that can be used to turn the at least one movable component.

10. The portable battery-operated tool according to claim 9, wherein the housing has an outer surface and a recess through the outer surface to receive the head of the one movable component so that the head on the at least one movable component does not project from the outer surface of the housing.

11. The portable battery-operated tool according to claim 6, wherein the battery comprises a casing with a first receptacle and the at least one movable component is advanced into the first receptacle with the battery in the second position.

12. The portable battery-operated tool according to claim 11, wherein the battery is movable along a line between the first and second positions and the at least one movable component is advanced transversely to the line from a released position into an engaged position wherein a part of the at least one movable component resides in the first receptacle with the battery in the second position.

13. The portable battery-operated tool according to claim 12, wherein the first receptacle comprises a blind opening.

14. The portable battery-operated tool according to claim 13, wherein the part of the at least one movable component is unthreaded.

15. The portable battery-operated tool according to claim 13, wherein the part of the at least one movable component and the first receptacle are configured so that the part of the at least one movable component blocks movement of the battery in each of two opposite directions along the line with the battery in the second position.

16. The portable battery-operated tool according to claim 15, wherein the at least one movable component cooperates with the housing so that the at least one movable component is guided by the housing relative to the casing into the engaged position.

17. The portable battery-operated tool according to claim 16, wherein there are cooperating threads on the at least one movable component and housing whereby turning of the at least one movable component around an axis in one direction advances the at least one movable component into the engaged position.

18. The portable battery-operated tool according to claim 17, wherein the at least one movable component can be turned around the axis oppositely to the one direction to fully separate the at least one movable component from the housing.

19. The portable battery-operated tool according to claim 17, wherein the housing has a non-metal wall and the threads on the housing are defined by a metal part on the housing.

20. The portable battery-operated tool according to claim 16, wherein the battery casing has a second receptacle into which the part of the at least one movable component is advanced with the battery in the first position so that the part of the one movable component blocks movement of the battery in each of the two opposite directions along the line with the battery in the first position.

21. The portable battery-operated tool according to claim 20, wherein the second receptacle is defined by an unthreaded opening.

22. The portable battery-operated tool according to claim I wherein the at least one component is threadably engaged with at least one of the battery and housing and is turned to change the at least one component between the engaged and released positions.

23. A portable battery-operated tool comprising:
a frame;
a working component on the frame;
a drive for the working component on the frame; and
a battery assembly on the frame,
the battery assembly comprising a battery with at least one first electrical connector and a housing with at least one second electrical connector,
the housing fixed on the frame,
the battery separable as a unit from the frame and housing,
the battery movable guidingly relative to the housing in a path in opposite directions between first and second positions,
whereby with the battery in the first position the at least one first electrical connector is electrically engaged with the at least one second electrical connector thereby to cause the battery to be operatively connected to the drive so as to power the drive,
whereby with the battery in the second position the at least one first electrical connector is electrically disengaged from the at least one second electrical connector so that the battery is not powering the drive to allow the drive to be operated,
the battery assembly further comprising a locking assembly, through which the battery is selectively releasably fixed in the second position,
wherein the locking assembly comprises at least one component movable relative to each of the battery and housing,
wherein the at least one component is configured to be turned around an axis so that the at least one component can be selectively positioned so that it: a) fixes the battery against movement in each of the opposite directions in the path with the at least one component in the second position; or b) releases the battery so that the battery can be changed from the second position into the first position.

24. A portable battery-operated tool comprising:
a frame;
a working component on the frame;
a drive for the working component on the frame; and
a battery assembly on the frame,
the battery assembly comprising a battery with at least one first electrical connector and a housing with at least one second electrical connector,
the housing fixed on the frame,
the battery separable as a unit from the frame and housing,
the battery movable guidingly in a path in opposite directions relative to the housing between first and second positions,
whereby with the battery in the first position the at least one first electrical connector is electrically engaged with the at least one second electrical connector thereby to cause the battery to be operatively connected to the drive so as to power the drive,
whereby with the battery in the second position the at least one first electrical connector is electrically disengaged from the at least one second electrical connector so that the battery is not powering the drive to allow the drive to be operated, the battery assembly further comprising a locking assembly, through which the battery is selectively releasably fixed in the second position, wherein the locking assembly comprises at least one component that is a threaded component that is fully separable from the battery and the threaded component is movable relative to the battery and housing and configured so that the threaded component blocks movement of the battery in each of the opposite directions with the battery in the second position.

\* \* \* \* \*